United States Patent [19]
Rothert et al.

[11] 3,939,710
[45] Feb. 24, 1976

[54] LIQUID FLOW METER

[75] Inventors: Klaus-Dieter Rothert, Gleidingen; Herbert Stilkenbaumer, Hildesheim; Gudrun Fischer; Armin Madler; Ulrich Ross, all of Berlin, Germany

[73] Assignees: Siemens Aktiengesellschaft, Munich, Germany; Diessel GmbH & Co., Hildesheim, Germany

[22] Filed: Aug. 8, 1974

[21] Appl. No.: 495,821

[30] Foreign Application Priority Data
Aug. 8, 1973  Germany............. 2340704

[52] U.S. Cl................... 73/253; 73/273
[51] Int. Cl.² ............. G01F 3/08; G01F 15/14
[58] Field of Search ............ 73/273, 253, 255, 256, 73/257, 258, 259, 71.6; 415/219 C

[56] References Cited
UNITED STATES PATENTS

| 211,769 | 1/1879 | Nash | 73/256 |
|---|---|---|---|
| 678,198 | 7/1901 | Richards | 415/219 C |
| 981,660 | 1/1911 | Kinney | 73/255 |
| 1,705,200 | 3/1929 | Morse | 415/219 C |
| 2,449,973 | 9/1948 | Bergman | 73/257 |
| 2,686,427 | 8/1954 | Ellett et al. | 73/71.6 |
| 3,022,740 | 2/1962 | Wilfley et al. | 415/219 C |
| 3,304,875 | 2/1967 | Copeland | 417/423 R |

Primary Examiner—Herbert Goldstein
Assistant Examiner—Anthony V. Ciarlante
Attorney, Agent, or Firm—Kenyon & Kenyon Reilly Carr & Chapin

[57] ABSTRACT

An improved arrangement in a liquid flow meter which contains at least one cylindrical measuring means rotating in a measuring chamber with the measuring means sliding with its one end face against a bottom part of the measuring chamber in which a stable, bell-shaped stiffening element rests against the edge of the bottom part and is arched thereover on the side facing away from the measuring chamber with a rigid connecting member attached to the bottom part and the stiffening element at least in the central region of the bottom part. Preferably support ribs with an external shape corresponding to the inner contours of the bell-shaped stiffening element are connected firmly with the bell-shaped stiffening element.

13 Claims, 2 Drawing Figures

LIQUID FLOW METER

BACKGROUND OF THE INVENTION

This invention relates to liquid flow meters of the type having at least cylindrical measuring means rotating in a measuring chamber and sliding with its end face along a bottom part of a measuring chamber in general and more particularly to an improved arrangement for such flow meters.

Liquid flow meters of this type are generally known as rotary-piston flow meters, driven-slide flow meters and oval-wheel flow meters. In a flow meter of this type if a relatively warm liquid for example a liquid at 90°C, suddenly flows through the meter a danger exist that because of thermal expansion a binding of the measuring means will take place thereby damaging it. Damage can be to the extent that the measuring means must be replaced. A problem like this typically arises with meters employed in the food industry such as milk meters where a hot rinse for cleaning purposes is performed.

In view of this problem the need for a liquid flow meter which can be operated without of seizing the measuring means even where relatively warm liquid suddenly flows through the meter is clear.

SUMMARY OF THE INVENTION

The present invention provides such a construction. In essence the solution of the present invention resides in the provision of a bell-shaped stiffening element which arches over the bottom part of the side facing away from the measuring chamber. The bell-shaped stiffening element is attached to the edges of the bottom part and, at least in the central region of the bottom part, a rigid connecting member is attached between the bottom part of the measuring chamber and the stiffening element. It is possible for the bell-shaped stiffening element to be connected with a positive fit to the bottom part. However a welded connection is clearly advantageous.

The present invention is based on the discovery that seizing of the measuring means when relatively warm liquids suddenly flows through the flow meter is caused by the fact that the planar bottom parts at the end faces of the measuring chamber buckle inward due to thermal expansion. In such instrument the clearance between the end face of the measuring means and the bottom part, which must be kept small for reasons of measurement technology, then becomes zero and binding of the measuring means takes place. The inward buckling of the bottom part is initially subjected to an elevated temperature thereby causing thermal expansion to occur initially only in the inner layer. At this point the outer layers of the bottom part are not subject to thermal expansion. As a result the inner layers of the bottom part become longer than the outer layers leading to buckling of the bottom part inward.

With the construction of the present invention the bell-shaped stiffening element in combination with the rigid connecting member prevents this buckling of the bottom part inward when it is warmed due to the inflowing relatively warm liquid. This results because the stable, bell-shaped stiffening element, due to its very great stiffness, keeps the bottom part in its desired planar shape. Even when a relatively warm liquid suddenly flows into the flow meter, such as occurs in the hot rinsing of a milk meter, no buckling of the bottom part inward and thus no seizing of the measuring means can take place.

It should be noted that a solution to the problem might consist of feeding the liquid flowing toward the liquid flow meters to the bottom parts on the outside also in order to accomplish simultaneous heating of the inner and outer layers of the bottom parts. However that solution becomes relatively expensive and is not practically feasible.

Various variations of the stiffening member and connecting member are disclosed including various shapes of the bell-shaped stiffening member and the inclusion of ribs for further stiffening.

DETAILED DESCRIPTION OF THE PREFERRED EMBODIMENT

Figure 1:
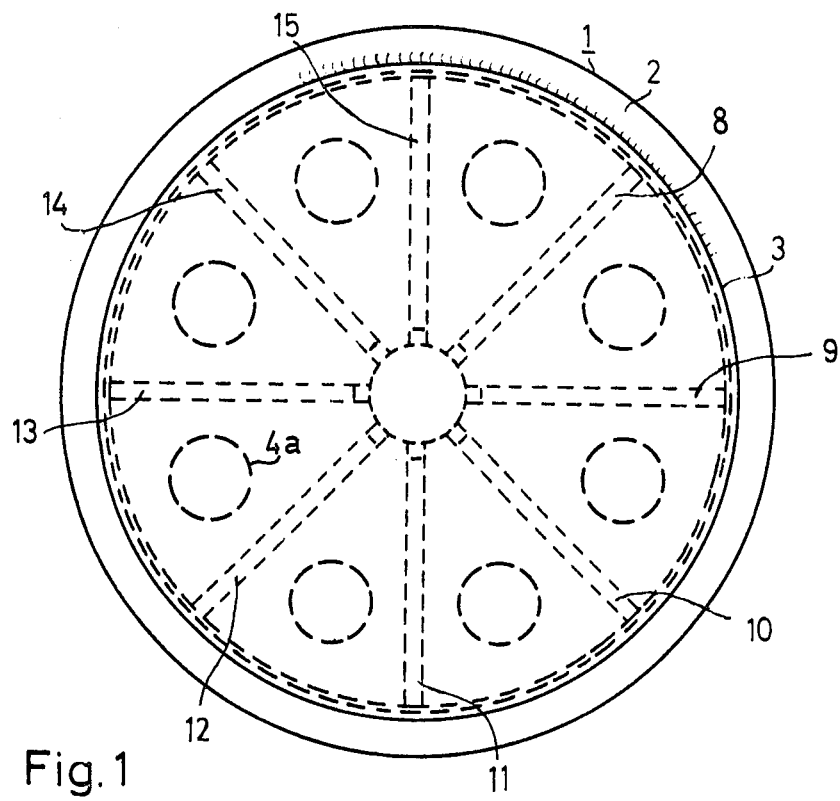
FIG. 1 is a plan view of a preferred embodiment of the present invention.

Shown on FIG. 1 is the bottom part 1 of a flow meter, in this case a rotary-piston flow meter. In such a flow meter, the measuring means will rotate within a space 16 with an edge of the measuring means sliding against a portion 17 of the bottom part 1. The problem which arises without the arrangement of the present invention is that a sudden inflow of hot liquid can cause an inward buckling of the bottom member 1 resulting in seizing of the measuring means. In the illustrated embodiment of the present invention the bottom part 1 is strongly connected at its edges 2 to a bell-shaped stiffening element, preferrably by welding using a weld 2a. Approximately in the center of the bell-shaped stiffening element 3, a rigid connecting member 4 is welded thereto. This connecting member 4 along with the journal 5 of the rotary-piston meter forms a pin 6 which is brought through an opening 7 in the bottom part 1. It is welded to the bottom part with a weld 7a resulting in a firm mechanically connection and a sealing action. The basic requirement for the connecting member 4 is that a connection between the bottom 1 and the stiffening element 3 be established. In the illustrated embodiment this is done in a particularly advantageous manner by combining the function of journal 5 and stiffening element 4. However such is not necessarily a limitation of the invention. Other arrangements are also possible. Where particularly unfavorable conditions of buckling are anticipated, several connecting members such as connecting member 4 may be used. These may be installed between the bottom part and the bell-shaped stiffening member and distributed over the bottom part rather than having one rigid connecting member engaging the central region of the bottom part. This is illustrated by the rigid connecting members 4a shown in dotted lines.

Figure 2:
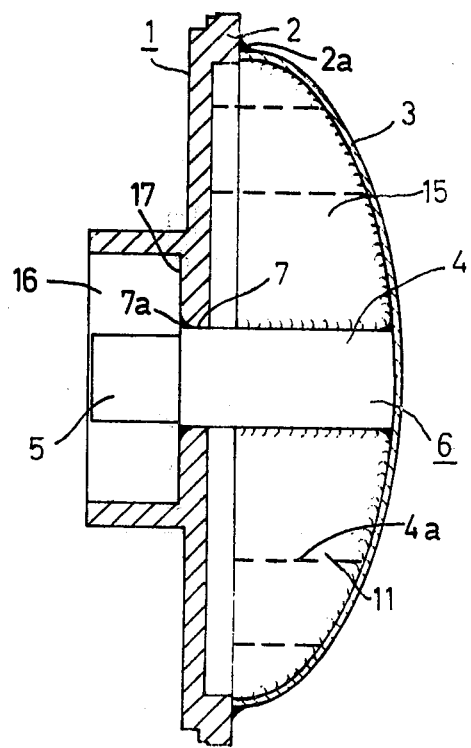
FIG. 2 is a cross-sectional elevation view of the embodiment of FIG. 1.

FIGS. 1 and 2 also illustrates a further provision which more completly prevents buckling of the bottom parts. Thus, there are shown support ribs 8 through 15 which are welded at the edge 2 to the bottom part along with being welded to the bell-shaped stiffening element 3 and the rigid connecting member 4. The ribs 8 through 15 are attached in a manner such that, due to the appropriately chosen shape of the bottom part 1, they do not rest closely against the surface thereof. The ribs have an external shape corresponding to the inner contours of the bell-shaped stiffening member as shown. They may be installed radially as illustrated or may be attached as cords inside the bell-shaped stiffening element 3. It is particularly advantageous that the support ribs be connected to a support element attached to the center of the bell-shaped stiffening element. In the illustrated embodiment they are thus attached to the rigid connecting member is the support element to which the support ribs are attached. It is also possible to provide a tube section surrounding the connecting member 4 for use as a support element if such ficilitates the manufacture and assembly.

The bell-shaped stiffening element 3 may have the shape of spherical segment, preferably a hemisphere. Furthermore it may also have the form of a compound curve or be a domed head. Shapes such as this are well known in the art from the design of boilers and other vessels.

As indicated above the illustrated embodiment is particularly advantageous where the measuring means is a rotary-piston guided in a ring chamber such as the chamber 16 and which has a journal 5 therein as described above. In that case an extension of the journal 5 forms the connecting member 4 with the connecting member 4 firmly attached to the bottom and to the bell-shaped stiffening element. With this design the connecting member is not an additional element but can be made in a single piece with the measuring chamber journal in a single machining operation.

Thus a liquid flow meter which operates in a trouble free manner even when liquids with relatively high temperatures are suddenly fed thereto has been shown. Although specific embodiments have been illustrated and described, it will be obvious to those skilled in the art that various modifications may be made without departing from the spirit of the invention which is intended to be limited solely by the appended claims.

What is claimed is:

1. In a liquid flow meter through which can be passed both warm and cool liquids, the meter including a measuring chamber having base members between which at least one rotatable measuring member having end-faces is mounted so that the end-faces glide along the base members when the measuring member is rotated, the improvement comprising: a support structure for at least one of the base members to prevent the same from deflecting inwardly in response to the warm liquid whereby jamming of the rotatable member is precluded, said support structure including a bell-shaped stiffening member arranged at the side of the base member facing away from the measuring chamber, said stiffening member being joined to the base member about the periphery thereof; and, a rigid connecting member joining the apex region of said bell-shaped member with the center region of the base member.

2. A liquid flow meter according to claim 1 and further including support ribs having an external shape corresponding to the inner contour of the bell-shaped stiffening element firmly connected to said bell-shaped stiffening element.

3. A liquid flow meter according to claim 2 wherein said support ribs are further connected to a support element attached at the center of said bell-shaped stiffening element.

4. A liquid flow meter according to claim 3 wherein said support element is a tube section surrounding said connecting member.

5. A liquid flow meter according to claim 3 wherein said support element is said rigid connecting member.

6. A liquid flow meter according to claim 1 wherein said bell-shaped stiffening element has the shape of a spherical segment.

7. A liquid flow meter according to claim 6 wherein said bell-shaped stiffening element is shaped as a hemisphere.

8. A liquid flow meter according to claim 1 wherein said bell-shaped stiffening element is a member having a compound-curve shape.

9. A liquid flow meter according to claim 1 wherein said bell-shaped stiffening element has the shape of a domed head.

10. A liquid flow meter according to claim 1 wherein a rotary-piston is the measuring means and is guided in a ring chamber by a journal therein and wherein said journal is arranged to extend from said measuring chamber through said bottom part, the extension of said journal forming said rigid connecting member and being rigidly attached and sealed into said bottom part and rigidly attached to said bell-shaped stiffening element.

11. A liquid flow meter according to claim 10 and further including support ribs having an external shape corresponding to the inner contour of said bell-shaped stiffening element firmly connected thereto and to said extension of said journal.

12. A liquid flow meter according to claim 11 wherein said stiffening element is welded to said bottom part and said connecting member is welded to said bottom part and to said bell-shaped stiffening element.

13. A liquid flow meter according to claim 1 wherein said stiffening element is welded to said bottom part and said connection member is welded to said bottom part and to said bell-shaped stiffening element.

* * * * *